United States Patent
Montanyà Silvestre

(10) Patent No.: US 7,876,182 B2
(45) Date of Patent: Jan. 25, 2011

(54) MINIATURIZED RELAY AND CORRESPONDING USES

(75) Inventor: Josep Montanyà Silvestre, Barcelona (ES)

(73) Assignee: Baolab Microsystems S. L., Barcelona (ES)

(*) Notice: Subject to any disclaimer, the term of this patent is extended or adjusted under 35 U.S.C. 154(b) by 941 days.

(21) Appl. No.: 10/534,736

(22) PCT Filed: Nov. 18, 2003

(86) PCT No.: PCT/ES03/00583

§ 371 (c)(1),
(2), (4) Date: May 12, 2005

(87) PCT Pub. No.: WO2004/046019

PCT Pub. Date: Jun. 3, 2004

(65) Prior Publication Data
US 2006/0021864 A1 Feb. 2, 2006

(30) Foreign Application Priority Data
Nov. 19, 2002 (ES) ................. 200202792

(51) Int. Cl.
*H01H 51/22* (2006.01)

(52) U.S. Cl. ........................ 335/78; 200/181
(58) Field of Classification Search ............. 335/78; 200/181; 333/101
See application file for complete search history.

(56) References Cited

U.S. PATENT DOCUMENTS

| | | | |
|---|---|---|---|
| 6,143,997 A | 11/2000 | Feng et al. | |
| 6,218,911 B1* | 4/2001 | Kong et al. | 333/101 |
| 6,307,452 B1* | 10/2001 | Sun | 333/262 |
| 6,613,993 B1* | 9/2003 | Strumpler | 200/181 |
| 6,621,135 B1* | 9/2003 | Sridhar et al. | 257/415 |
| 6,882,256 B1 | 4/2005 | Yip | |
| 6,917,268 B2* | 7/2005 | Deligianni et al. | 335/78 |

(Continued)

FOREIGN PATENT DOCUMENTS
EP 1093142 4/2001

(Continued)

OTHER PUBLICATIONS
International Search Report for corresponding PCT/ES2003/000583 mailed Feb. 6, 2004.

(Continued)

*Primary Examiner*—Anh T Mai
*Assistant Examiner*—Bernard Rojas
(74) *Attorney, Agent, or Firm*—Staas & Halsey LLP

(57) ABSTRACT

A miniaturized relay having a first zone facing a second zone, a first condenser plate, a second condenser plate arranged in the second zone, and smaller than or equal to the first plate, an intermediate space between both zones, a conductive element arranged in the intermediate space and which is mechanically independent from the adjacent walls and can move freely across the intermediate space depending on voltages present between both plates, contact points of an electric circuit, in which the conductive element closes the electric circuit by making contact with the contact points. Such relays can be used, for example, as: accelerometers, accelerometers in airbags, tiltmeters, Coriolis force detectors, microphones, in acoustic applications, pressure sensors, flow sensors, temperature sensors, gas sensors and magnetic field sensors.

10 Claims, 16 Drawing Sheets

U.S. PATENT DOCUMENTS

| | | | |
|---|---|---|---|
| 7,126,447 B2 * | 10/2006 | Kawai | 335/78 |
| 7,141,989 B1 * | 11/2006 | Liu | 324/661 |
| 2002/0140533 A1 | 10/2002 | Miyazaki et al. | |
| 2007/0236307 A1 * | 10/2007 | Liu | 333/105 |

FOREIGN PATENT DOCUMENTS

| | | |
|---|---|---|
| EP | 1093143 | 4/2001 |
| EP | 1 489 639 | 12/2004 |
| WO | WO 01/06543 | 1/2001 |

OTHER PUBLICATIONS

U.S. Application filed concurrently herewith based on PCT/ES2003/000584, filed May 12, 2005, Josep Montanyà Silvestre, Baolab Microsystems S.L.

* cited by examiner

MINIATURIZED RELAY AND CORRESPONDING USES

FIELD OF THE INVENTION

This invention relates to a miniaturized relay. The invention also refers to different uses for miniaturized relays according to the invention.

STATE OF THE ART

Currently there are various alternatives for the production of miniaturized relays, in particular, in the context of technologies known as MEMS technology (micro electro-mechanical systems), Microsystems and/or Mircomachines. In principal such may be classified according to the type of force or actuation mechanism they use to move the contact electrode. The classification usually applied is thus between electrostatic magnetic, thermal and piezoelectric relays. Each one has its advantages and its drawbacks. However miniaturization techniques require the use of activation voltages and surfaces which are as small as possible. Relays known in the state of the art have several problems impeding their advance in this respect.

A manner of reducing the activation voltage is precisely to increase the relay surface areas, which renders miniaturization difficult, apart from being conducive to the appearance of deformations reducing the useful life and reliability of the relay. In electrostatic relays, another solution for decreasing the activation voltage is to greatly reduce the space between the electrodes, or use very thin electrodes or special materials, so that the mechanical recovery force is very low. However this implies problems of sticking, since capillary forces are very high, which thus also reduces the useful working life and reliability of these relays. The use of high activation voltages also has negative effects such as ionization of the components, accelerated wearing due to strong mechanical solicitation and the electric noise which the relay generates.

Electrostatic relays also have a significant problem as to reliability, due to the phenomenon known as "pull-in", and which consists in that, once a given threshold has been passed, the contact electrode moves in increasing acceleration against the other free electrode. This is due to the fact that as the relay closes, the condenser which exerts the electrostatic force for closing, greatly increases its capacity (and would increase to infinity if a stop were not imposed beforehand). Consequently there is a significant wear on the electrodes due to the high electric field which is generated and the shock caused by the acceleration to which the moving electrode has been exposed.

Thermal, magnetic and piezoelectric approaches require special materials and micromachined processes, and thus integration in more complex MEMS devices, or in a same integrated with electronic circuitry is difficult and/or costly. Additionally the thermal approach is very slow (which is to say that the circuit has a long opening or closing time) and uses a great deal of power. The magnetic approach generates electromagnetic noise, which renders having close electronic circuitry much more difficult, and requires high peak currents for switching.

In this specification relay should be understood to be any device suitable for opening and closing at least one external electric circuit, in which at least one of the external electric circuit opening and closing actions is performed by means of an electromagnetic signal.

In the present description and claims the expression "contact point" has been used to refer to contact surfaces in which an electric contact is made (or can be made). In this respect they should not be understood as points in the geometric sense, since they are three-dimensional elements, but rather in the electric sense, as points in an electric circuit.

SUMMARY OF THE INVENTION

An objective of the present invention is to overcome the abovementioned drawbacks. This is achieved by means of a miniaturized relay characterized in that it includes:
  a first zone facing a second zone,
  a first condenser plate,
  a second condenser plate arranged in the second zone, in which the second plate is smaller than or equal to the first plate,
  an intermediate space arranged between the first zone and the second zone,
  a conductive element arranged in the intermediate space, the conductive element being mechanically independent of the first zone and the second zone and being suitable for performing a movement across the intermediate space dependant on voltages present in the first and second condenser plates,
  a first contact point of an electric circuit, a second contact point of the electric circuit, in which the first and second contact point define first stops, in which the conductive element is suitable for entering into contact with the first stops and in which the conductive element closes the electric circuit when in contact with the first stops.

In fact in the relay according to the invention the conductive element, which is to say the element responsible for opening and closing the external electric circuit (across the first contact point and the second contact point), is a detached part capable of moving freely. I.e. the elastic force of the material is not being used to force one of the relay movements. This allows a plurality of different solutions, all benefiting from the advantage of needing very low activation voltages and allowing very small design sizes. The conductive element is housed in the intermediate space. The intermediate space is closed by the first and second zone and by lateral walls which prevent the conductive element from leaving the intermediate space. When voltage is applied to the first and second condenser plate charge distributions are induced in the conductive element which generates electrostatic forces which in turn move the conductive element in a direction along the intermediate space. By means of different designs to be described in detail below this effect can be used in several different ways.

Additionally, a relay according to the invention likewise satisfactorily resolves the previously mentioned problem of "pull-in".

Another additional advantage of the relay according to the invention is the following: in conventional electrostatic relays, if the conductive element sticks in a given position (which depends to a great extent, among other factors, on the humidity) there is no possible manner of unsticking it (except by external means, such as for example drying it) since due to the fact that the recovery force is elastic, is always the same (depending only on the position) and cannot be increased. On the contrary, if the conductive element sticks in a relay according to the invention, it will always be possible to unstick it by increasing the voltage.

The function of the geometry of the intermediate space and the positioning of the condenser plates can furnish several different types of relays, with as many applications and functioning methods.

For example, the movement of the conductive element can be as follows:
- a first possibility is that the conductive element move along the intermediate space with a travelling movement, i.e., in a substantially rectilinear manner (excluding of course possible shocks or oscillations and/or movements provoked by unplanned and undesired external forces) between the first and second zones.
- a second possibility is that the conductive element have a substantially fixed end, around which can rotate the conductive element. The rotational axis can serve the function of contact point for the external electric circuit and the free end of the conductive element can move between the first and second zones and make, or not make, contact with the other contact point, depending on its position. As will be outlined below, this approach has a range of specific advantages.
- a third possibility is that the conductive element move along the intermediate space with a movement that combines a travelling movement between the first and second zones, induced by the electrostatic forces generated, and a movement that is perpendicular to the former, induced by a Coriolis force. This solution will be described in greater detail below.

Advantageously the first contact point is between the second zone and the conductive element. This allows a range of solutions to be obtained, discussed below.

A preferable embodiment is achieved when the first plate is in the second zone. Alternatively the relay can be designed so that the first plate is in the first zone. In the first case a relay is obtained which has a greater activation voltage and which is faster. On the other hand, in the second case the relay is slower, which means that the shocks experienced by the conductive element and the stops are smoother, and energy consumption is lower. One can obviously choose between one or the other alternatives depending on the specific requirements in each case.

A preferable embodiment of the invention is obtained when the second contact point is likewise in the second zone. In this case one will have a relay in which the conductive element performs the substantially rectilinear travelling movement. When the conductive element is in contact with the first stops, which is to say with the first and second contact point of the electric circuit, the electric circuit is closed, and it is possible to open the electric circuit by means of different types of forces, detailed below. To again close the electric circuit, it is enough to apply voltage between the first and second condenser plates. This causes the conductive element to be attracted toward the second zone, again contacting the first and second contact point.

Should the fist condenser plate be in the first zone and the second condenser plate in the second zone, a manner of achieving the necessary force to open the circuit cited in the above paragraph is by means of the addition of a third condenser plate arranged in the second zone, in which the third condenser plate is smaller than or equal to the first condenser plate, and in which the second and third condenser plates are, together, larger than the first condenser plate. With this arrangement the first condenser plate is to one side of the intermediate space and the second and third condenser plates are to the other side of the intermediate space and close to one another. In this manner one can force the movement of the conductive element in both directions by means of electrostatic forces and, in addition, one can guarantee the closing of the external electric circuit even though the conductor element remains at a voltage in principle unknown, which will be forced by the external circuit that is closed.

Another preferable embodiment of the invention is achieved when the relay additionally includes a third condenser plate arranged in said second zone and a fourth condenser plate arranged in said first zone, in which said first condenser plate and said second condenser plate are equal to each other and said third condenser plate and said fourth condenser plate are equal to one another. In fact, in this manner, if one wishes the conductive element to travel towards the second zone, one can apply voltage to the first and fourth condenser plates, on one side, and to the second or to the third condenser plates, on the other side. Given that the conductive element will move toward the place in which is located the smallest condenser plate, it will move toward the second zone. Likewise one can obtain movement of the conductive element toward the first zone by applying a voltage to the second and third condenser plates and to the first or the fourth condenser plates. The advantage of this solution, over the simpler three condenser plate solution, is that it is totally symmetrical, which is to say that it achieves exactly the same relay behavior irrespective of whether the conductive element moves toward the second zone or the first zone. Advantageously the first, second third and fourth condenser plates are all equal with respect to one another, since generally it is convenient that in its design the relay by symmetrical in several respects. On one hand there is symmetry between the first and second zone, as commented above. On the other hand it is necessary to retain other types of symmetry to avoid other problems, such as for example the problems of rotation or swinging in the conductive element and which will be commented upon below. In this respect it is particularly advantageous that the relay include, additionally, a fifth condenser plate arranged in the first zone and a sixth condenser plate arranged in the second zone, in which the fifth condenser plate and the sixth condenser plate are equal to each other. On one hand increasing the number of condenser plates has the advantage of better compensating manufacturing variations. On the other, the several different plates can be activated independently, both from the point of view of voltage applied as of activation time. The six condenser plates can all be equal to each other, or alternatively the three plates of a same side can have different sizes with respect to one another. This allows minimizing activation voltages. A relay which has three or more condenser plates in each zone allows the following objectives to all be achieved:
- it can function in both direction symmetrically,
- it has a design which allows a minimum activation voltage for fixed overall relay dimensions, since by having two plates active in one zone and one plate active in the other zone distinct surface areas can always be provided,
- it allows minimization of current and power consumption, and also a smoother relay functioning,
- it can guarantee the opening and closing of the relay, independently of the voltage transmitted by the external circuit to the conductive element when they enter in contact,
- in particular if the relay has six condenser plates in each zone, it can in addition comply with the requirement of central symmetry which, as we shall see below, is another significant advantage. Therefore another preferable embodiment of the invention is obtained when the relay includes six condenser plates arranged in the first zone and six condenser plates arranged in the second zone. However it is not absolutely necessary to have six condenser plates in each zone to achieve central symmetry: it is possible to achieve it as well, for example, with three condenser plates in each zone, although in this case one must forego minimizing current and power consumption and optimizing the "smooth" functioning of the relay. In general, increasing the number of condenser plates in each zone allows greater flexibility and versatility in the design, whilst it allows a reduction of the variations inherent in manufacture, since the manufacturing variation of each of the plates will tend to be compensated by the variations of the remaining plates.

However it should not be discounted that in certain cases it can be interesting to deliberately provoke the existence of force moments in order to force the conductive element to perform some kind of revolution additional to the travelling movement. It could be advantageous, for example, to overcome possible sticking or friction of the conductive element with respect to the fixed walls.

Advantageously the relay includes a second stop (or as many second stops as there are first stops) between the first zone and the conductive element. In this manner one also achieves a geometric symmetry between the first zone and the second zone. When the conductive element moves toward the second zone, it can do so until entering into contact with the first stops, and will close the external electric circuit. When the conductive element moves toward the first zone it can do so until entering into contact with the second stop(s). In this manner the movement performed by the conductive element is symmetrical.

Another preferable embodiment of the invention is achieved when the relay includes a third contact point arranged between the first zone and the conductive element, in which the third contact point defines a second stop, such that the conductive element closes a second electric circuit when in contact with the second contact point and third contact point. In this case the relay acts as a commuter, alternately connecting the second contact point with the first contact point and with the third contact point.

A particularly advantageous embodiment of the previous example is achieved when the conductive element includes a hollow cylindrical part which defines an axis, in the interior of which is housed the second contact point, and a flat part which protrudes from one side of the radially hollow cylindrical part and which extends in the direction of the axis, in which the flat part has a height, measured in the direction of the axis, which is less than the height of the cylindrical part, measured in the direction of the axis. This specific case complies simultaneously with the circumstance that the conductive element perform a rotational movement around one of its ends (cf. the "second possibility" cited above). Additionally, the cylindrical part is that which rests on bearing surfaces (one at each end of the cylinder, and which extends between the first zone and the second zone) whilst the flat part is cantilevered with respect to the cylindrical part since it has a lesser height. Thus the flat part is not in contact with walls or fixed surfaces (except the first and third contact point) and, in this manner, the sticking and frictional forces are lessened. As to the second point of contact, it is housed in the internal part of the cylindrical part, and serves as rotational axis as well as second contact point. Thus an electric connection is established between the first and second contact points or between the third and second contact points. The hollow cylindrical part defines a cylindrical hollow, which in all cases has a surface curved to the second contact point, thus reducing the risks of sticking and frictional forces.

Another particularly advantageous embodiment of the previous example is obtained when the conductive element includes a hollow parallelepipedic part which defines an axis, in the interior of which is housed the second contact point, and a flat part which protrudes from one side of the radially hollow parallelepipedic part and which extends in the direction of the axis, in which the flat part has a height, measured in the direction of the axis, which is less than the height of the parallelepipedic part, measured in the direction of the axis. In fact, it is an embodiment similar to that above, in which the parallelepipedic part defines a parallelepipedic hollow. This solution can be particularly advantageous in the case of very small embodiments, since in this case the resolution capacity of the manufacturing process (in particular in the case of the photolithographc procedures) obliges the use of straight lines. In both cases it should be emphasized that the determining geometry is the geometry of the interior hollow and that, in fact, several different combinations are possible:

axis (second contact point) having a rectangular section and hollow with rectangular section, axis having a circular section and hollow having a circular section, axis having a circular section and hollow having a rectangular section and vice versa, although the first two combinations are the most advantageous.

Logically, should the sections be rectangular, there should be enough play between the axis and the parallelepipedic part such that the conductive element can rotate around the axis. Likewise in the case of circular sections there can be a significant amount of play between the axis and the cylindrical part, such that the real movement performed by the conductive element is a combination of rotation around the axis and travel between the first and second zone. It should be noted, additionally, that it is also possible that the second stop not be connected electrically to any electric circuit: in this case a relay will be obtained which can open and close only one electric circuit, but in which the conductive element moves by means of a rotation (or by means of a rotation combined with travel).

Another preferable embodiment of the invention is obtained when the relay includes third and fourth contact points arranged between the first zone and the conductive element, in which the third and fourth contact points define second stops, such that the conductive element closes a second electric circuit when in contact with the third and fourth contact points. In fact, in this case the relay can alternatively connect two electric circuits.

Advantageously each of the assemblies of condenser plates arranged in each of the first zone and second zone is centrally symmetrical with respect to a center of symmetry, in which said center of symmetry is superposed to the center of masses of the conductive element. In fact, each assembly of the condenser plates arranged in each of the zones generates a field of forces on the conductive element. If the force resulting from this field of forces has a non nil moment with respect to the center of masses of the conductive element, the conductive element will not only undergo travel but will also undergo rotation around its center of masses. In this respect it is suitable to provide that the assemblies of plates of each zone have central symmetry in the case that this rotation is not advantageous, or on the other hand it could be convenient to provide central asymmetry should it be advantageous to induce rotation in the conductive element with respect to its center of masses, for example to overcome frictional forces and/or sticking.

As already indicated, the conductive element is usually physically enclosed in the intermediate space, between the first zone, the second zone and lateral walls. Advantageously between the lateral walls and the conductive element there is play sufficiently small such as to geometrically prevent the conductive element entering into contact simultaneously with a contact point of the group formed by the first and second contact points and with a contact point of the group formed by the third and fourth contact points. That is to say, the conductive element is prevented from adopting a transversal position in the intermediate space in which it connects the first electric circuit to the second electric circuit.

To avoid sticking and high frictional forces it is advantageous that the conductive element have rounded external surfaces, preferably that it be cylindrical or spherical. The spherical solution minimizes the frictional forces and sticking in all directions, whilst the cylindrical solution, with the bases of the cylinder facing the first and second zone allow reduced frictional forces to be achieved with respect to the lateral walls whilst having large surfaces facing the condenser plates — efficient as concerns generation of electrostatic forces. This second solution also has larger contact surfaces with the contact points, diminishing the electric resistance which is introduced in the commuted electric circuit.

Likewise, should the conductive element have an upper face and a lower face, which are perpendicular to the movement of the conductive element, and at least one lateral face, it is advantageous that the lateral face have slight protuberances. These protuberances will further allow reduction of sticking and frictional forces between the lateral face and the lateral walls of the intermediate space.

Advantageously the conductive element is hollow. This allows reduced mass and thus achieves lower inertia.

Should the relay have two condenser plates (the first plate and the second plate) and both in the second zone, it is advantageous that the first condenser plate and the second condenser plate have the same surface area, since in this manner the minimal activation voltage is obtained for a same total device surface area.

Should the relay have two condenser plates (the first plate and the second plate) and the first plate is in the first zone whilst the second plate is in the second zone, it is advantageous that the first condenser plate has a surface area that is equal to double the surface area of the second condenser plate, since in this manner the minimal activation voltage is obtained for a same total device surface area.

Another preferable embodiment of a relay according to the invention is obtained when one of the condenser plates simultaneously serves as condenser plate and as contact point (and thus of stop). This arrangement will allow connection of the other contact point (that of the external electric circuit) at a fixed voltage (normally VCC or GND) or leaving it at high impedance.

The subject of the invention likewise relates to preferential uses for relays according to the invention. Apart from use as electric switch and as electric commuter, the relay according to the invention can be used as a sensor for different physical magnitudes. In such cases, the physical magnitude which one wishes to measure exerts a force to open the electric circuit and by means of a given voltage applied to the condenser plates a force is generated which counteracts the former and the external electric circuit is again closed (or vice versa, i.e., it is necessary to apply a voltage to maintain the electric circuit open whilst the physical magnitude which one wishes to study tends to close the circuit). The determination of the voltage required allows determination of the physical magnitude one wishes to measure. In general miniaturization allows the inclusion of several sensors simultaneously, which increases the reliability of the corresponding determination. The increase in reliability is due to the possibility that these different sensors measure the same magnitude, and subsequently one calculates the mean. A particularly advantageous alternative is obtained by arranging a relay according to the invention with electric contacts in both zones, i.e. three or four contacts in total, since in this case one can measure the physical magnitude under study for the time lapsed between interruption of the contact with the electric contact(s) in one zone and the establishment of the electric contact with the electric contact(s) of the other zone, at constant voltage (or even varying the voltage as a further parameter to be accounted for). Below are provided various specific examples:

Accelerometer: the force due to outside acceleration moves the conductive element, opening the electric circuit. The voltage applied to the condenser plates creases an opposing force. When the circuit again closes the voltage required can be determined and thus, the acceleration to which the conductive element has been subjected. This can also take place in reverse, such as commented upon above, the outside acceleration being that which tends to close the circuit. Miniaturization allows provision of various sensors, orientated according to the three coordinate axes. Specific examples would be airbags and tiltmeters.

Pressure sensor: if the electric element separates two chambers subjected to different pressures (a pressure to be determined and a reference pressure), air pressure, or in general any other non conducting fluid, applied to one of the faces of the conductive element would tend to open (or close) the electric circuit. The voltage necessary to again achieve closing (opening) of the circuit allows measure of the pressure of said fluid or, specifically, the difference of pressure between said fluid and the reference chamber. A specific example of this type of sensor would be a microphone.

Flow sensor: if the conductive element has an aperture through which can pass a current of fluid or if it has an extension which is immersed in a current of fluid, a relay according to the invention can be used as flow sensor. As in the above examples, by means of a given voltage applied to the condenser plates one can counteract the force generated by the physical magnitude one wishes to measure, in this case the hydraulic or aerodynamic force generated by the fluid current. As in the above case concerning the pressure sensor, the fluid cannot however be an electrical conductor.

Temperature sensor. In this case it should be taken into account that the time the relay takes to switch basically depends upon external acceleration, voltage applied and the surface area coefficients of the condenser plates. If these plates are made from materials having different thermal expansion coefficients, the surface area coefficients of the condenser plates will change with temperature. In this manner there is a relationship between the switching time and the temperature with respect to a given voltage applied to the plates. Similarly the minimum voltage necessary to switch the relay will depend on the temperature.

Acoustic applications (loudspeakers). In colliding with the stops or against the condenser plates which attract it, the conductive element will produce noise. By co-ordinating a significant number of relays, which can be integrated in a single chip, one can gather the different acoustic waves together in phase and thus create a resulting acoustic wave that is audible. This audible acoustic wave will be highly directional. This can be an advantage when what is wanted is unidirectional waves; alternatively the relays can be distributed and/or activated in different directions and/or dephased with respect to time to obtain a multidirectional wave. It is also possible to control directionality by controlling the precise moment in which each relay is activated, which is to say, by controlling the relative temporal dephases between the relays. In this manner one can dynamically change the directionality of the acoustic wave, so that it can be directed according to requirements without having to change the geometric distribution of the relays. The presence of the electric contacts allows a determination of the exact moment in which the shock of the conductive element with the corresponding stops takes place.

Detector of Coriolis forces (usually known as gyrostats). These detectors determine the rotational speed of an object by determining the Coriolis force. To do so one needs a relay having condenser plates arranged in the first zone and in the second zone, and contact points arranged in an axis perpendicular to the first zone-second zone axis. The conductive element should be in continual movement from one end to the other so that it is always provided with a given velocity, which will depend on the voltage applied to the condenser plates. If there is a rotational velocity which is perpendicular to the plane formed by the axis of movement (first zone-second zone axis), and the contact points, then the conductive element will experience Coriolis acceleration which will be perpendicular to the first zone-second zone axis. This will mean that the conductive element touches the contact points of one side (or of the opposite side, depending on the rotational direction) if the voltage applied to the condenser plates and, thus, the speed with which the conductive element moves, is sufficiently high. In touching the contact points the external circuit will be closed thus confirming that the conditions necessary for such have been obtained. The magnitude of the external rotation will be, thus, related with the magnitude of the voltage applied to the condenser plates, and the rotational direction can be known based on which of the two pairs of contacts has been short-circuited, taking into account the direction of the velocity being proportioned at such time to the conductive element. Sensors of this type can be included simultaneously in three perpendicular directions, which allows any rotation in space to be determined.

Gas sensor. Should the conductive element be of a material capable of reacting and/or absorbing molecules of a given gas (or should such material be incorporated in the conductive element) a conductive element is obtained having a variable mass depending on the concentration of said gas. This change in mass influences the activation voltage, as well as the time lapse in moving from one end to another. Gas concentration can thus be determined.

In general, in all sensors cited above one can determine the corresponding magnitude by detecting in each case what is the minimum voltage necessary to switch the relay, or detect which is the switching time for a fixed applied voltage. In general it is easier to detect the switching time, since it can be increased very simply using digital technology, whilst generating variable voltages implies using analog circuits. However when detecting the voltage which switches the relay, there is the advantage that the relay is required to switch much less frequently, reducing wear and increasing long term reliability and working life.

Another possible application of a relay according to the invention is as magnetic field detector. For such the relay must be maintained in its closed position, i.e. with the conductive element closing the first external electric circuit, and a current with a certain intensity should be passed through the conductive element. If the relay is subjected to a magnetic field, the conductive element will be subjected to a magnetic force and, if the direction is suitable, this magnetic force will tend to open the electric circuit. By determining the voltage necessary to maintain the electric circuit closed and taking into account other parameters (geometry and mass of the conductive element, current intensity through it, etc.) one can determine a spatial component of the magnetic field and in a given direction. If one provides a plurality of sensors orientated in space such that all spatial components of the magnetic field can be determined, the entire magnetic field can be determined. If the relay has electric contact points both in the first zone and in the second, such that two external electric circuits can be closed, then with one relay a spatial component of the magnetic field can be determined, irrespective of its direction, since if the conductive element is in one zone, the magnetic field will tend to press it against the contact points instead of separating it, placing the conductive element in the opposite zone the magnetic field will tend to separate it from the contact points, and thus determination is possible. Knowing which of the electric circuits was used for said determination gives the direction. It should be observed that, to use the relay as magnetic field detector the electric circuit should be closed and a sufficiently high electric current should be passed through the conductive element for it to experience the corresponding magnetic force. In fact, when the magnetic field opens the electric circuit, electric current will cease to pass through the conductive element and the magnetic force will disappear, and thus the conductive element will again come into contact with the electric contact points, since the electrostatic field will remain active. Some time should thus be allowed to run before re-establishing the electric current and the conductive element again experiences the magnetic force. To differentiate the magnetic force which the conductive element experiences from other external accelerations, the magnetic field sensor could include several relays, some responsible for detecting the magnetic force as outlined above, and others for measuring accelerations as described above in the relevant section. By compensating the results obtained for each component the real magnetic field can be determined. Alternatively, one and the same relay can perform magnetic field readings (by provoking the passage of current through the conductive element) interspersed with acceleration readings (in which current is not passed through the conductive element).

BRIEF DESCRIPTION OF THE DRAWINGS

Other advantages and characteristics of the invention will become evident from the following description in which, entirely non-limitatively, are described some preferential embodiments of the invention, with reference to the appended drawings. The figures show.

As shall be seen below, the preferred embodiments of the invention illustrated in the figures include a combination of the several different alternatives and options considered above, whilst a person skilled in the art will be able to see what alternatives and options can be combined together in different ways.

DETAILED DESCRIPTION OF SOME EMBODIMENTS OF THE INVENTION

Figure 1:
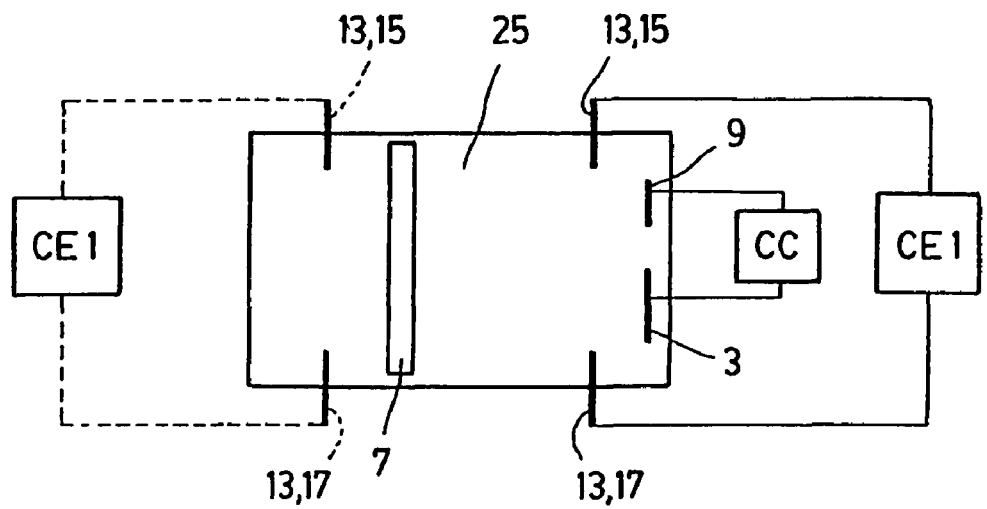
FIG. 1, a simplified diagram of a relay with two condenser plates in the second zone thereof.

FIG. 1 shows a first basic functioning mode of a relay according to the invention. The relay defines an intermediate space 25 in which is housed a conductive element 7, which can move freely along the intermediate space 25, since physically it is a detached part which is not physically joined to the walls which define the intermediate space 25. The relay also defines a first zone, on the left in FIG. 1, and a second zone, on the right in FIG. 1. In the second zone are arranged a first condenser plate 3 and a second condenser plate 9. In the example shown in FIG. 1 both condenser plates 3 and 9 have different surface areas, although they can be equal with respect to one another. The first condenser plate 3 and the second condenser plate 9 are connected to a CC control circuit. Applying a voltage between the first condenser plate 3 and the second condenser plate 9, the conductive element is always attracted towards the right in FIG. 1, towards the condenser plates 3 and 9. The conductive element 7 will be moved towards the right until being stopped by first stops 13, which are a first contact point 15 and a second contact point 17 of a first external electric circuit CE1, such that the first external electric circuit CE1 is closed.

Figure 2:
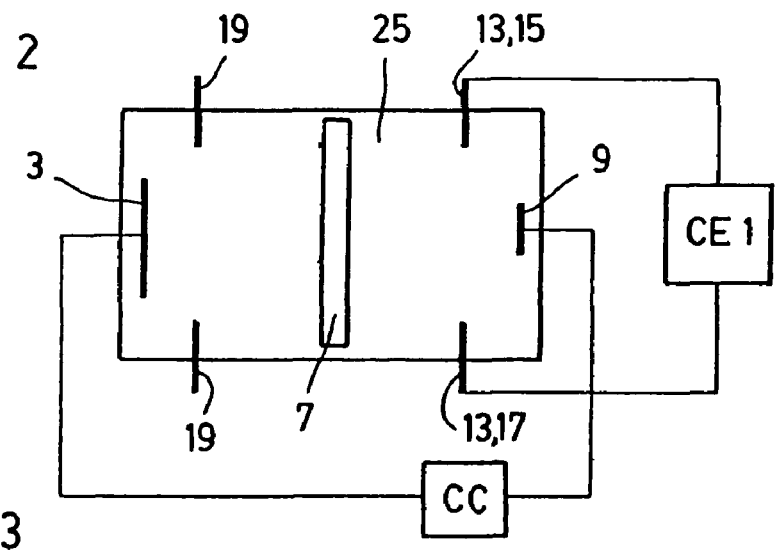
FIG. 2, a simplified diagram of a relay with two condenser plates, one in each of the zones thereof.

FIG. 2 shows a second basic functioning mode for a relay according to the invention. The relay again defines an intermediate space 25 in which is housed a conductive element 7, which can move freely along the intermediate space 25, a first zone, on the left in FIG. 2, and a second zone, on the right in FIG. 2. In the second zone is arranged a second condenser plate 9 whilst in the first zone is arranged a first condenser plate 3. The first condenser plate 3 and the second condenser plate 9 are connected to a CC control circuit. Applying a voltage between the first condenser plate 3 and the second condenser plate 9, the conductive element is always attracted to the right of the FIG. 2, towards the smallest condenser plate, i.e. towards the second condenser plate 9. For this reason, the fact that in the example shown in FIG. 2 both condenser plates 3 and 9 have different surface areas is, in this case, absolutely necessary, since if they were to have equal surface areas, the conductive element 7 would not move in any direction. The conductive element 7 will move towards the right until being stopped by first stops 13, which are a first contact point 15 and a second contact point 17 of a first external electric circuit CE1, such that the first external electric circuit CE1 is closed. On the left there are second stops 19 which in this case do not serve any electric function but which stop the conductive element 7 from entering into contact with the first condenser plate 3. In this case the stops 19 can be removed, since no problem is posed by the conductive element 7 entering into contact with the first condenser plate 3. This is because there is only one condenser plate on this side, if there had been more than one and if they had been connected to different voltages then the stops would have been necessary to avoid a short-circuit.

The configurations of the relays of FIGS. 1 and 2 are suitable for being used as sensors, in which the magnitude to be measured exercises a force which is that which will be counteracted by the electrostatic force induced in the conductive element 7. Such as represented, in both cases the magnitude to be measured must exercise a force tending to open the electric circuit CE1, whilst the electrostatic force will tend to close it. However, a relay can be designed to work exactly in the opposite respect: such that the magnitude to be measured would tend to close the electric circuit CE1 whilst the electrostatic force would tend to open it. In this case, the first stops 13 would need to be positioned on the left in FIGS. 1 and 2, together with the corresponding electric circuit CE1. In FIG. 1 this possibility has been shown in a broken line. If the stops are placed on both sides then the sensor can detect magnitude in both directions, although the algorithm would have to change, from tending to close to tending to open, when a change in direction is detected as having occurred, as would happen when not obtaining closing/opening with the minimum voltage, which is zero. It should be recalled that the sign of the voltage applied does not effect the direction of movement of the conductive element 7.

Figure 3:
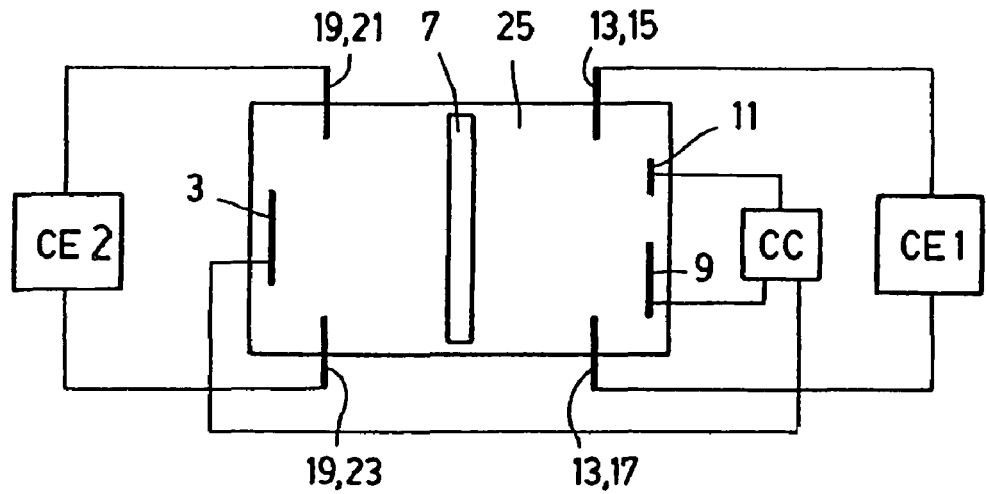
FIG. 3, a simplified diagram of a relay with three condenser plates.

To achieve moving the conductive element 7 in both directions by means of electrostatic forces, it is necessary to provide a third condenser plate 11, as shown in FIG. 3. Given that the conductive element 7 will always move towards where the smallest condenser plate is located, it is necessary, in this case, that the third condenser plate 11 be smaller than the first condenser plate 3, but that the sum of the surface areas of the second condenser plate 9 and the third condenser plate 11 be larger than the first condenser plate 3. In this manner, activating the first condenser plate 3 and the second condenser plate 9, connecting them to different voltages, but not the third condenser plate 11, which will remain in a state of high impedance, the conductive element 7 can be moved to the right, whilst activating the three condenser plates 3, 9 and 11 the conductor element 7 can be moved to the left. In the latter case the second condenser plate 9 and the third condenser plate 11 are supplied at a same voltage, and the first condenser plate 3 at a different voltage. The relay of FIG. 3 has, in addition, a second external electric circuit CE2 connected to the second stops 19, in a manner that these second stops 19 define a third contact point 21 and a fourth contact point 23.

Should two condenser plates be provided in each of the first and second zones, the movement of the conductive element 7 can be solicited in two different ways:

applying a voltage between the two condenser plates of a same zone, so that the conductive element is attracted by them (functioning as in FIG. 1)

applying a voltage between one condenser plate of one zone and a (or both) condenser plate(s) of the other zone, such that the conductive element 7 is attracted towards the zone in which the electrically charged condenser surface area is smallest (functioning as in FIG. 2).

Figure 4:
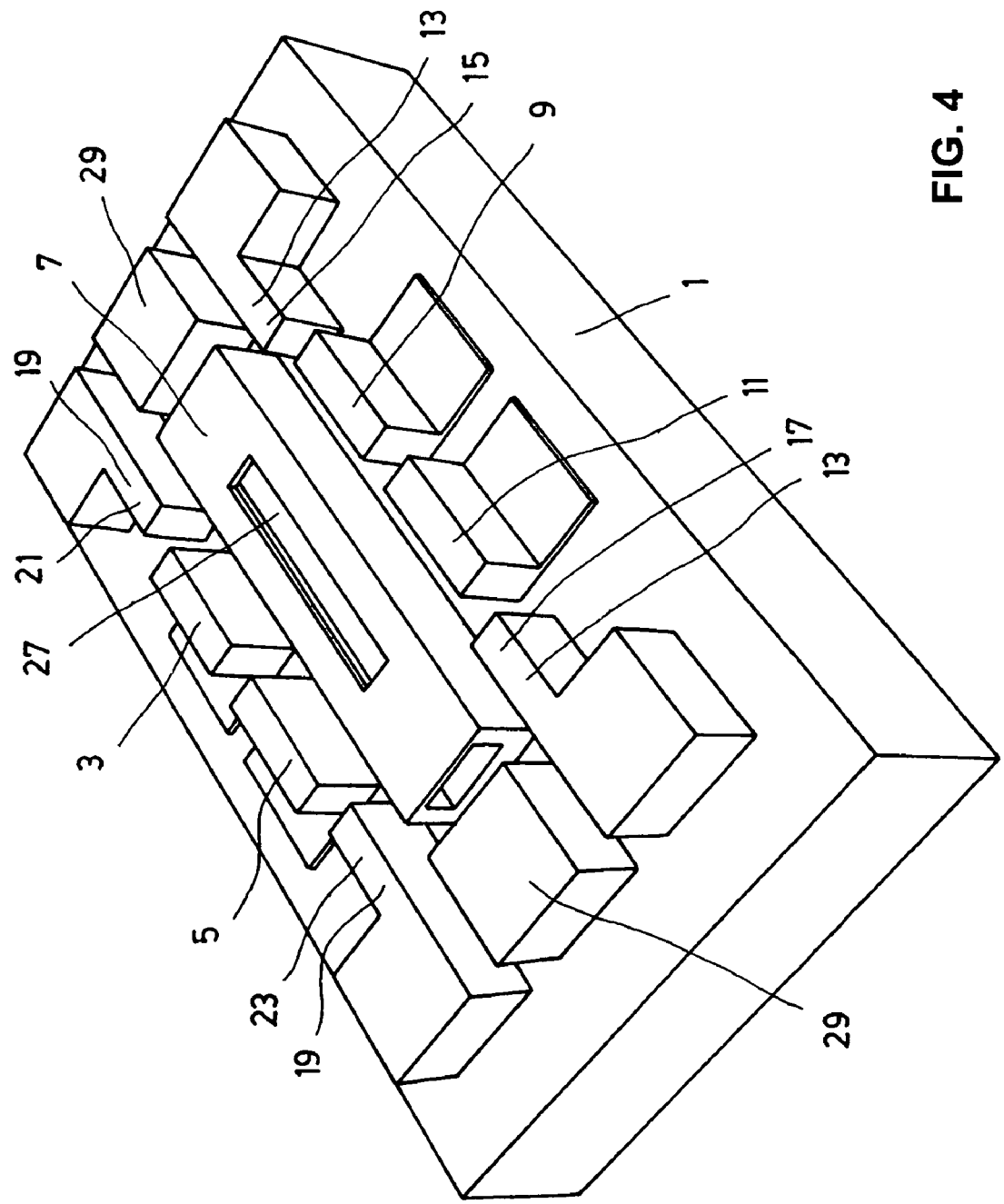
FIG. 4, a perspective view of a first embodiment of a relay according to the invention, uncovered.
Figure 5:
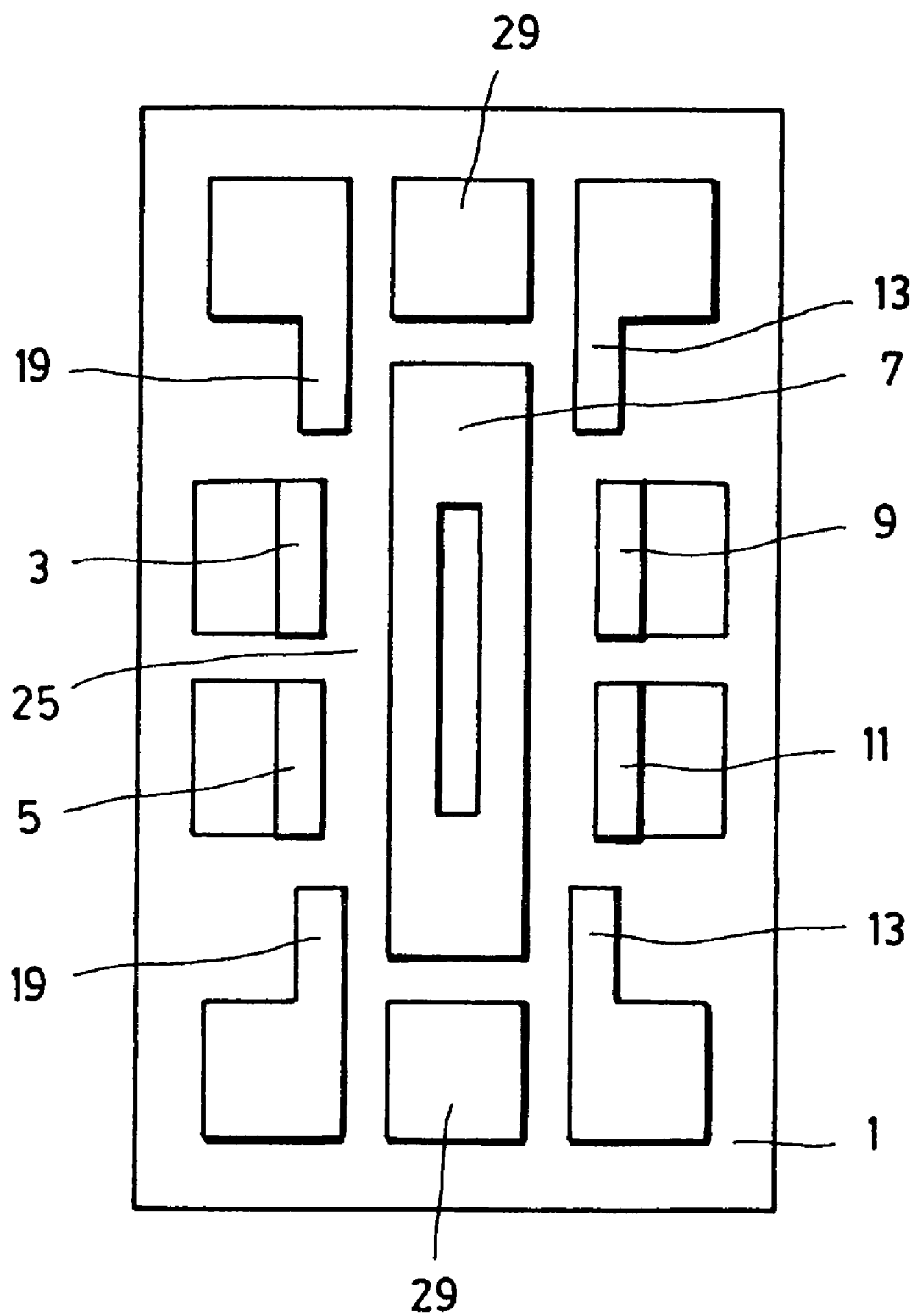
FIG. 5, a plan view of the relay of FIG. 4.

FIGS. 4 and 5 illustrate a relay designed to be manufactured with EFAB technology. This micromechanism manufacturing technology by means of layer depositing is known by persons skilled in the art, and allows the production of several layers and presents a great deal of versatility in the design of three-dimensional structures. The relay is mounted on a substrate 1 which serves as support, and which in several of the appended drawings has not been illustrated in the interest of simplicity. The relay has a first condenser plate 3 and a fourth condenser plate 5 arranged on the left (according to FIG. 5) of a conductive element 7, and a second condenser plate 9 and a third condenser plate 11 arranged on the right of the conductive element 7. The relay also has two first stops 13 which are the first contact point 15 and the second contact point 17, and two second stops 19 which are the third contact point 21 and the fourth contact point 23. The relay is covered in its upper part, although this cover has not been shown in order to be able to clearly note the interior details.

The relay goes from left to right, and vice versa, according to FIG. 5, along the intermediate space 25. As can be observed the first stops 13 and the second stops 19 are closer to the conductive element 7 than the condenser plates 3, 5, 9 and 11. In this manner the conductive element 7 can move from left to right, closing the corresponding electric circuits, without interfering with the condenser plates 3, 5, 9 and 11, and their corresponding control circuits.

The conductive element 7 has a hollow internal space 27.

There is play between the conductive element 7 and the walls which form the intermediate space 25 (which is to say the first stops 13, the second stops 19, the condenser plates 3, 5, 9 and 11 and the two lateral walls 29) which is sufficiently small to prevent the conductive element 7 from spinning along an axis perpendicular to the plane of the drawing of FIG. 5 enough to contact the first contact point 15 with the third contact point 21 or the second contact point 17 with the fourth contact point 23. In the figures, however, the play is not drawn to scale, so as to allow greater clarity in the figures.

Figure 6:
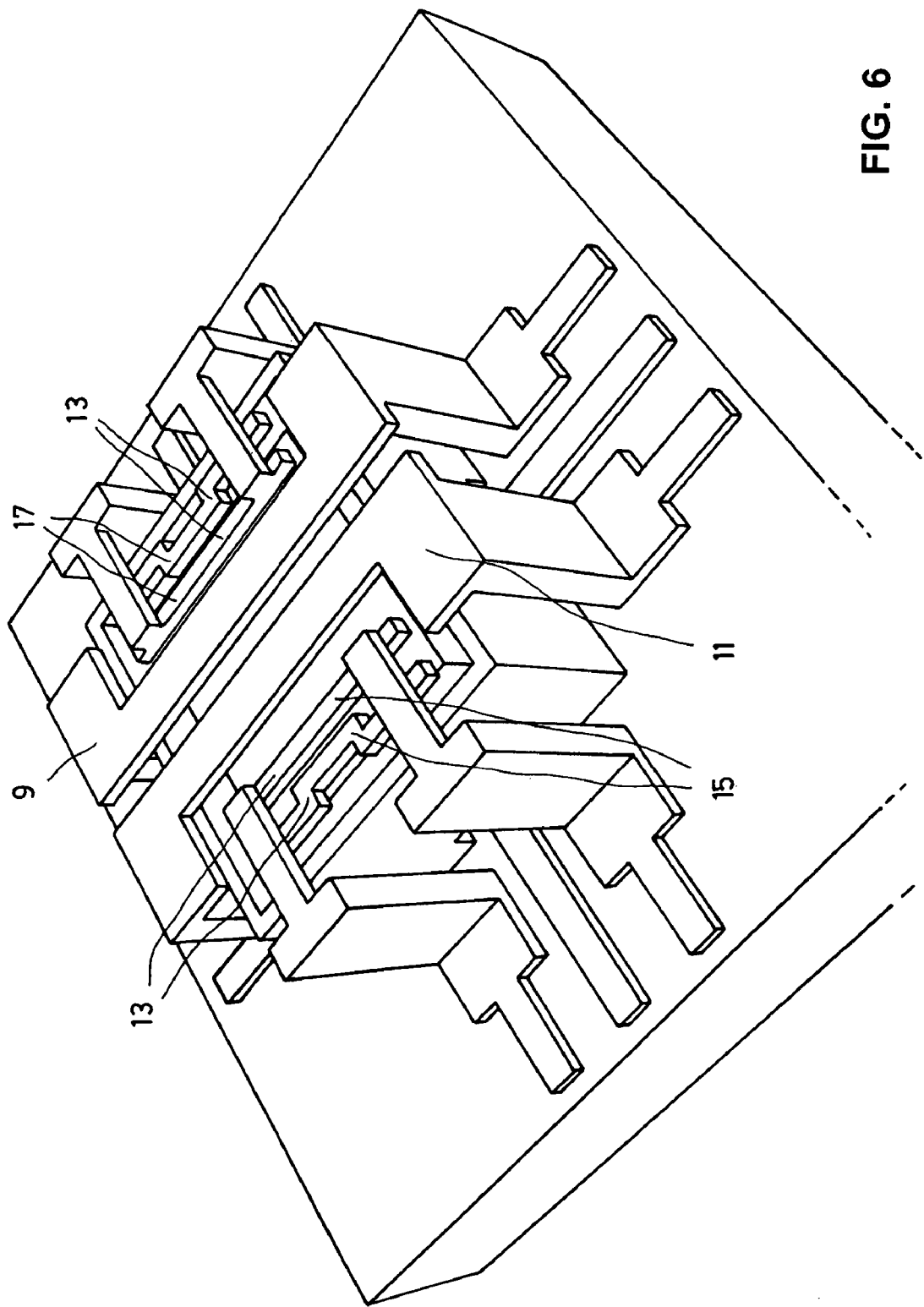
FIG. 6, a perspective view of a second embodiment of a relay according to the invention.
Figure 7:
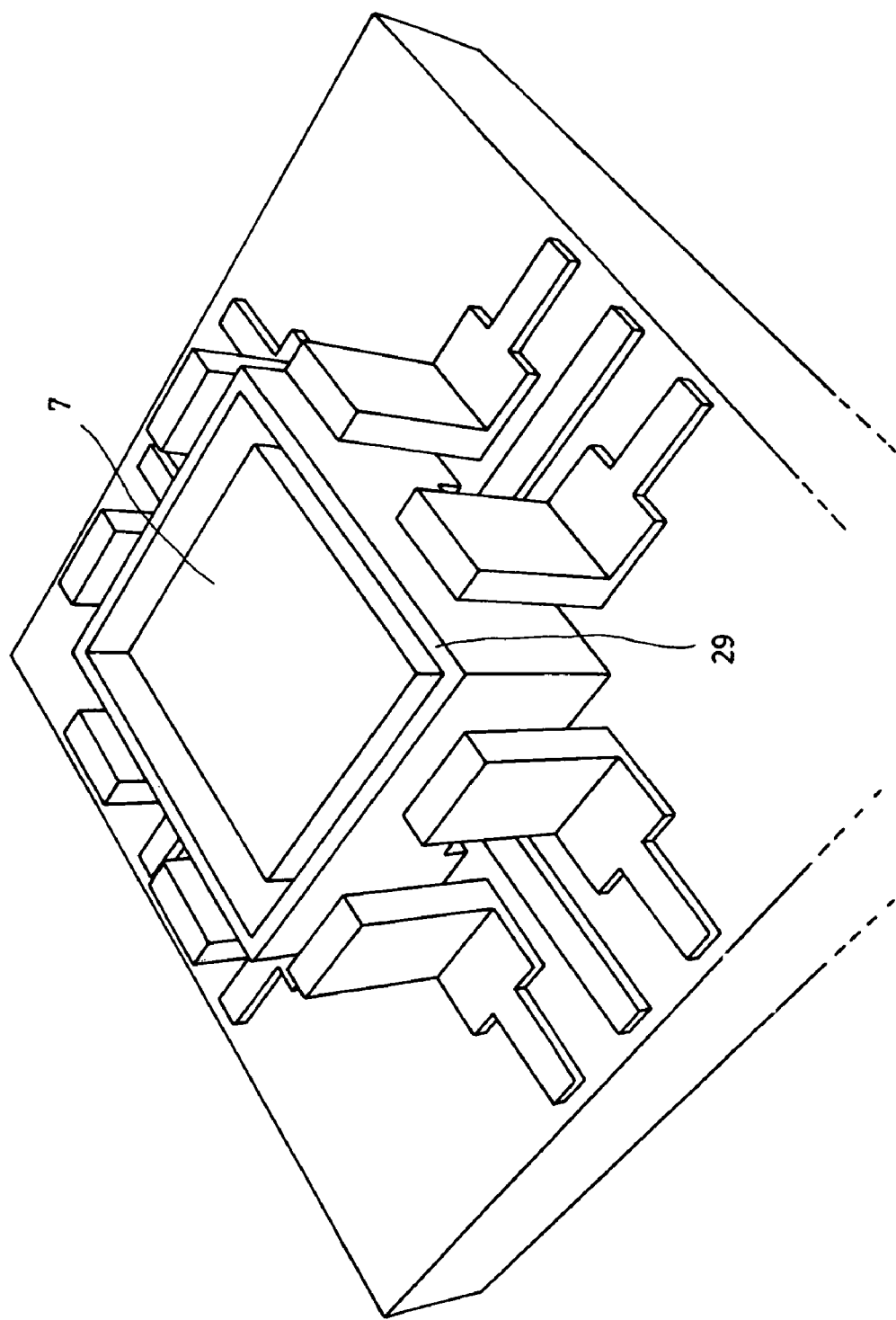
FIG. 7, a perspective view of the relay of FIG. 6 from which the components of the upper end have been removed.
Figure 8:
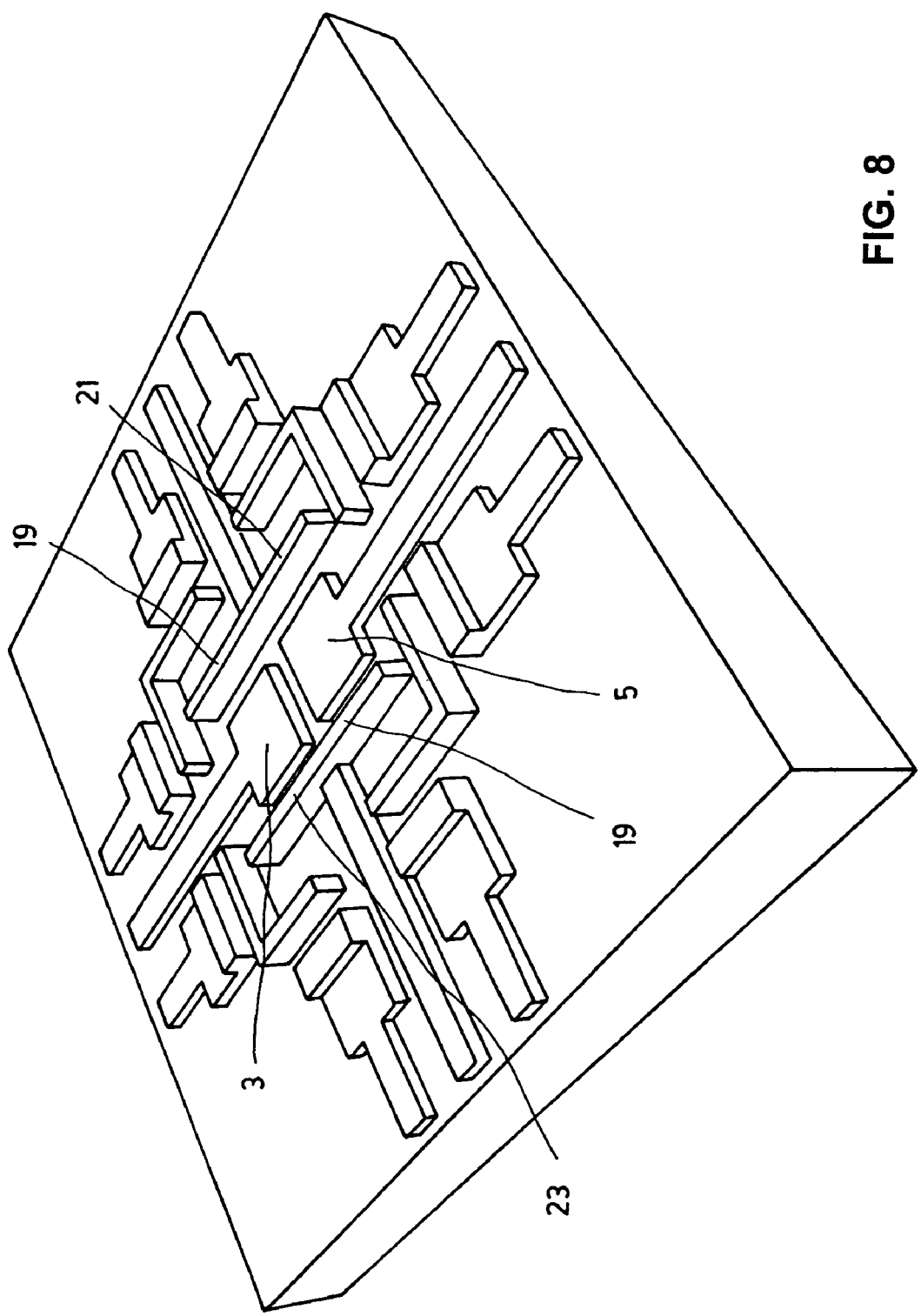
FIG. 8, a perspective view of the lower elements of the relay of FIG. 6.

FIGS. 6 to 8 show another relay designed to be manufactured with EFAB technology. In this case the conductive element 7 moves vertically, in accordance with FIGS. 6 to 8. The use of one or the other movement alternative in the relay depends on design criteria. The manufacturing technology consists in the deposit of several layers. In all figures the vertical dimensions are exaggerated, which is to say that the physical devices are much flatter than as shown in the figures. Should one wish to obtain larger condenser surfaces it would be preferable to construct the relay with a form similar to that shown in the FIGS. 6 to 8 (vertical relay), whilst a relay with a form similar to that shown in FIGS. 4 and 5 (horizontal relay) would be more appropriate should a lesser number of layers be desired. Should certain specific technologies be used (such as those usually known as polyMUMPS, Dalsa, SUMMIT, Tronic's, Qinetiq's, etc) the number of layers will always be limited. The advantage of a vertical relay is that larger surfaces are obtained with a smaller chip area, and this implies much lower activation voltages (using the same chip area).

Conceptually the relay of FIGS. 6 to 8 is very similar to the relay of FIGS. 4 and 5, and has the first condenser plate 3 and the fourth condenser plate 5 arranged in the lower part (FIG. 8) as well as the second stops 19 which are the third contact point 21 and the fourth contact point 23. As can be seen in the drawings the second stops 19 are above the condenser plates, such that the conductive element 7 can bear on the second stops 19 without entering into contact with the first and fourth condenser plates 3, 5. In the upper end (FIG. 6) is the second condenser plate 9, the third condenser plate 11 and two first stops 13 which are the first contact point 15 and the second contact point 17. In this case the play between the conductive element 7 and the lateral walls 29 is also sufficiently small to avoid the first contact point 15 contacting with the third contact point 21 or the second contact point 17 contacting with the fourth contact point 23.

Figure 9:
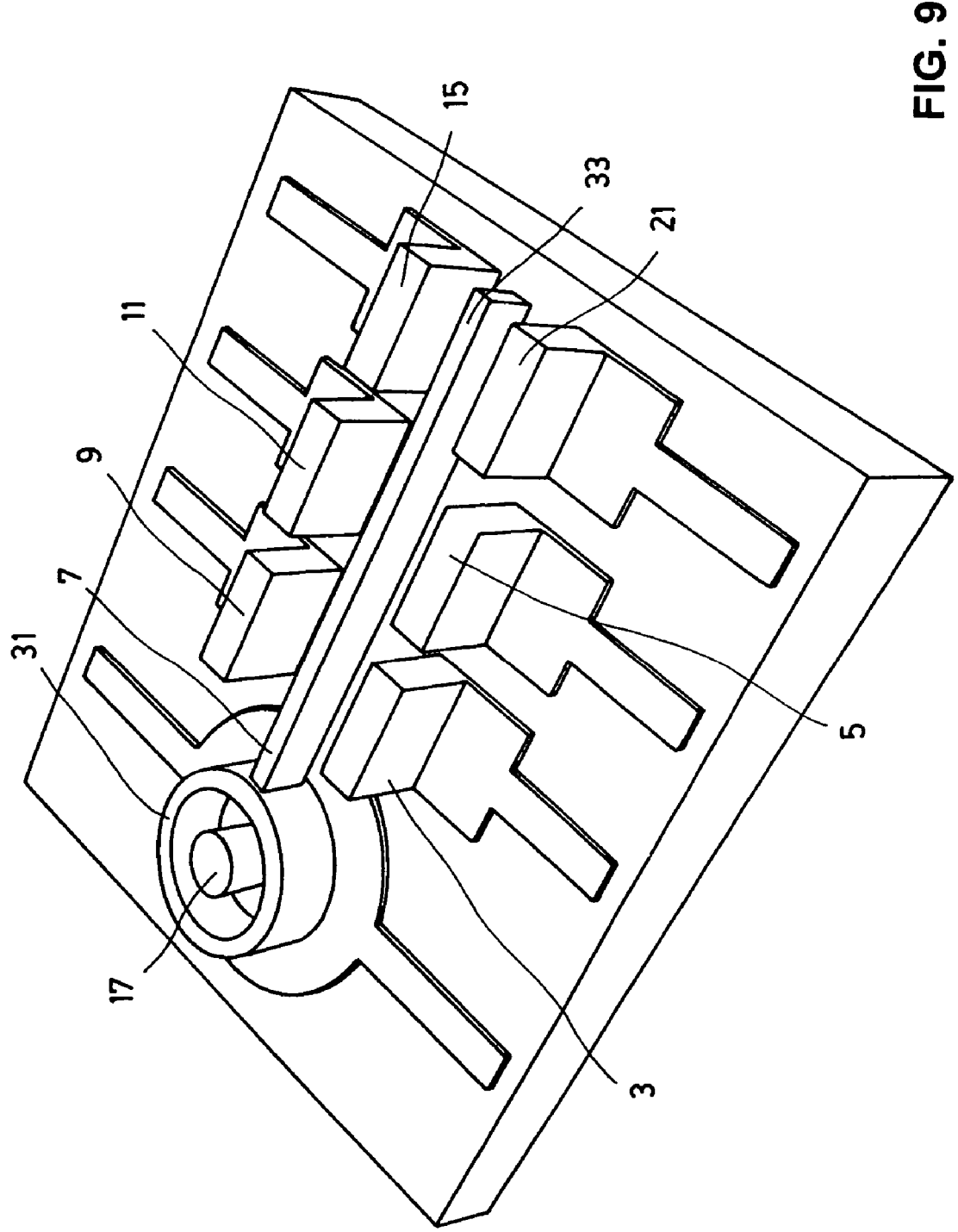
FIG. 9, a perspective view of a third embodiment of a relay according to the invention, uncovered.
Figure 10:
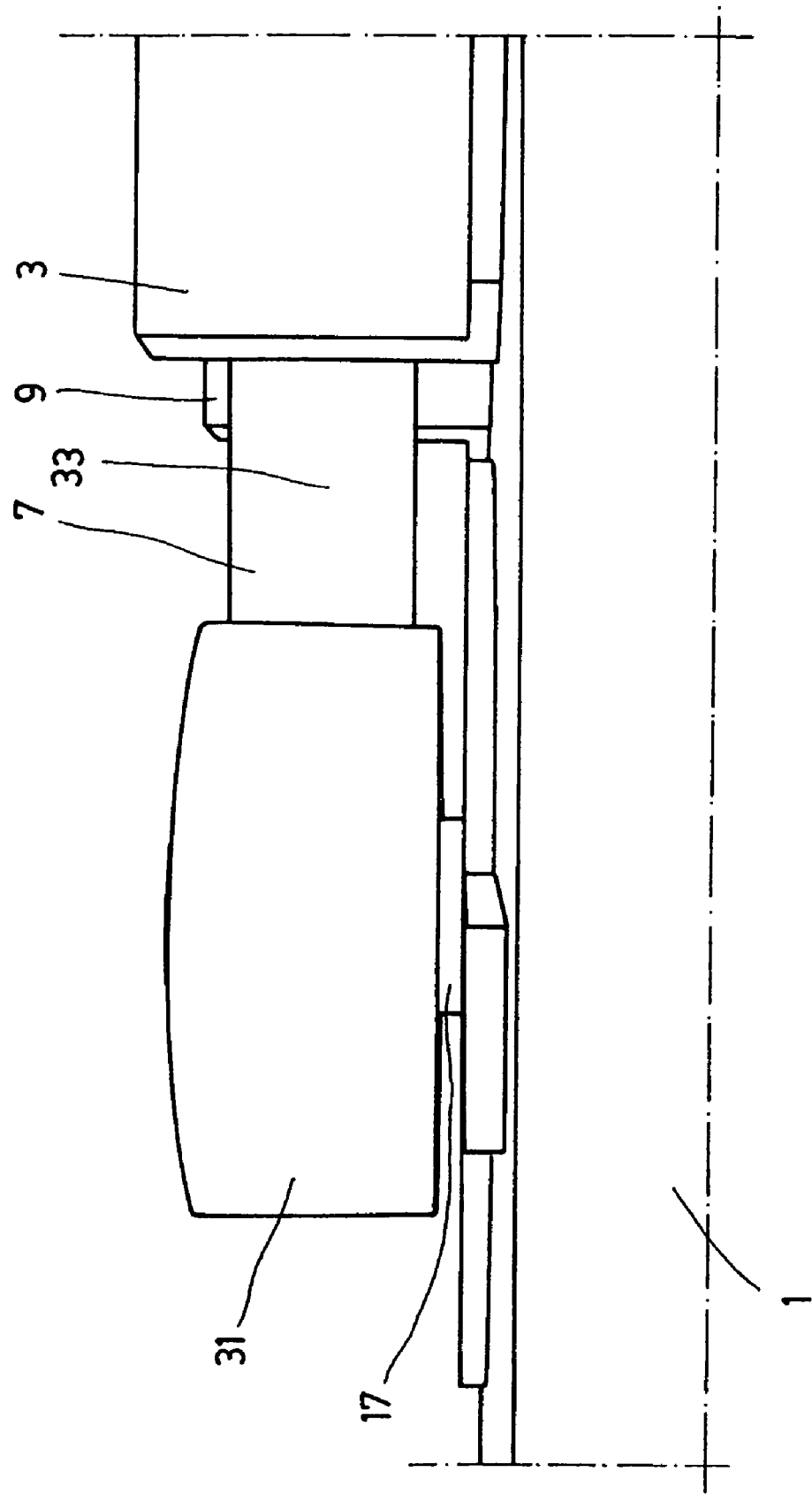
FIG. 10, a perspective view, in detail, of the cylindrical part of the relay of FIG. 9.

The relay shown in FIGS. 9 and 10 is an example of a relay in which the movement of the conductive element 7 is substantially a rotation around one of its ends. This relay has a first condenser plate 3, a second condenser plate 9, a third condenser plate 11 and a fourth condenser plate 5, all mounted on a substrate 1. Additionally there is a first contact point 15 and a third contact point 21 facing each other. The distance between the first contact point 15 and the third contact point 21 is less than the distance between the condenser plates. The conductive element 7 has a cylindrical part 31 which is hollow, in which the hollow is likewise cylindrical. In the interior of the cylindrical hollow is housed a second contact point 17, having a cylindrical section.

In this manner the conductive element 7 will establish an electrical contact between the first contact point 15 and the second contact point 17 or the third contact point 21 and the second contact point 17. The movement performed by the conductive element 7 is substantially a rotation around the axis defined by the cylindrical part 31. The play between the second contact point 17 and the cylindrical part 31 is exaggerated in the FIG. 9, however it is certain that a certain amount of play exists, the movement performed by the conductive element 7 thus not being a pure rotation but really a combination of rotation and travel.

From the cylindrical part 31 extends a flat part 33 which has a lesser height than the cylindrical part 31, measured in the direction of the axis of said cylindrical part 31. This can be observed in greater detail in FIG. 10, in which is shown a view almost in profile of the cylindrical part 31 and the flat part 33. In this manner one avoids the flat part 33 entering into contact with the substrate 1, which reduces the frictional forces and sticking.

As can be seen, substituting a parallelepipedic part for the cylindrical part 31 and replacing the second contact point 17 having a circular section by one having a quadrangular section, as long as play is sufficient, one can design a relay which is conceptually equivalent to that of FIGS. 9 and 10.

If, for example, in the relay shown in FIGS. 9 and 10 the first contact point 15 and/or the third contact point 21 were eliminated, then it would be the very condenser plates (specifically the third condenser plate 11 and the fourth condenser plate 5) which would serve as contact points and stops. By means of a suitable choice of voltages at which the condenser plates must work one can obtain that this voltage be always VCC or GND. Another possibility would be, for example, that the third contact point 21 were not electrically connected to any external circuit. Then the third contact point would only be a stop, and when the conductive element 7 contacts the second contact point 17 with the third contact point 21, the second contact point 17 would be in a state of high impedance in the circuit.

Figure 11:
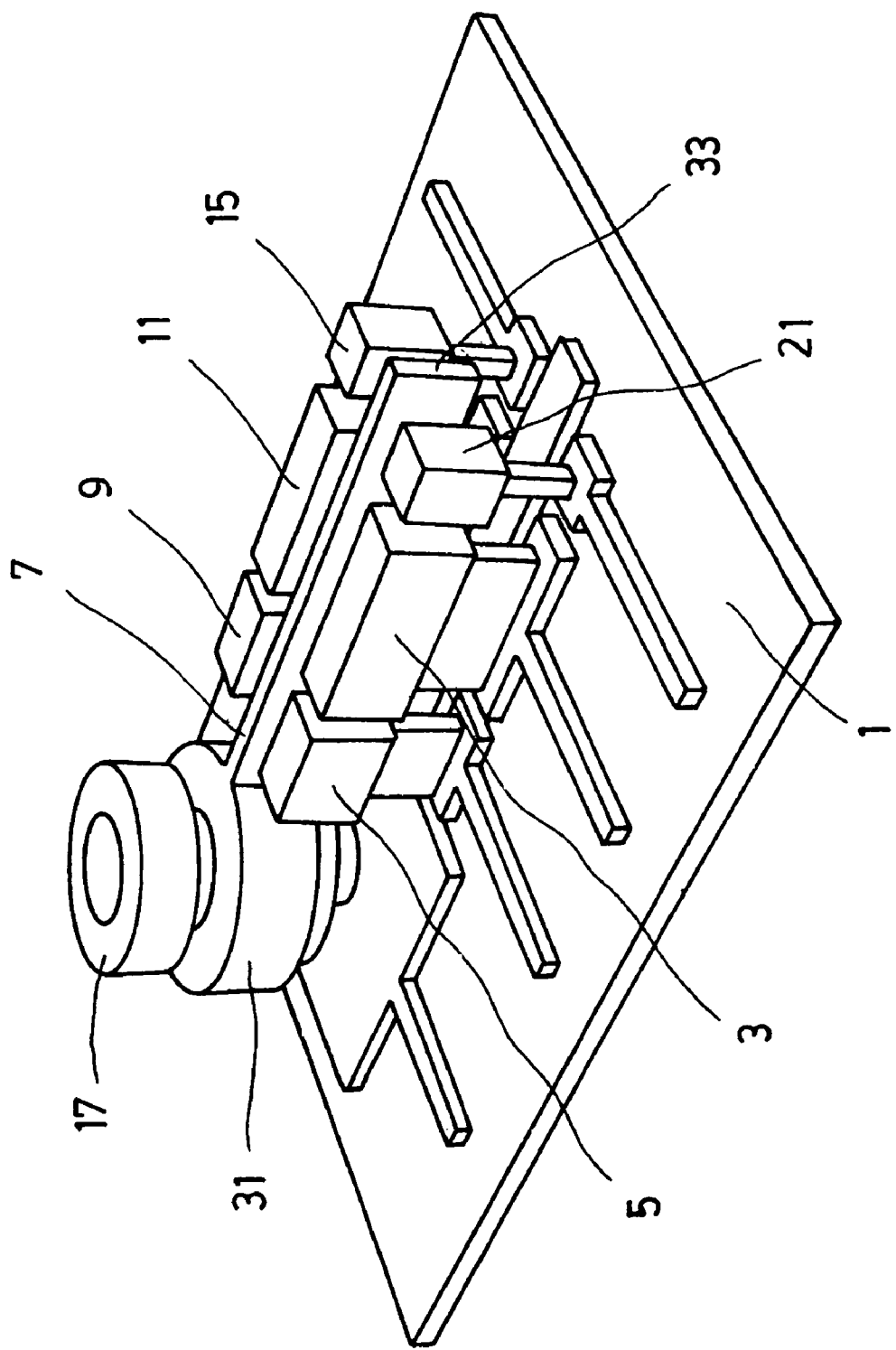
FIG. 11, a perspective view of a fourth embodiment of a relay according to the invention.

The relay shown in FIG. 11, is designed to be manufactured with polyMUMPS technology. As already mentioned, this technology is known by a person skilled in the art, and is characterized by being a surface micromachining with three structural layers and two sacrificial layers. However, conceptually it is similar to the relay shown in FIGS. 9 and 10, although there are some differences. Thus in the relay of FIG. 11 the first condenser plate 3 is equal to the third condenser plate 11, but is different from the second condenser plate 9 and the fourth condenser plate 5, which are equal to each other and smaller than the former. With respect to the second contact point 17 it has a widening at its upper end which permits retaining the conductive element 7 in the intermediate space 25. The second contact point 17 of FIGS. 9 and 10 also can be provided with this kind of widening. It is also worth noting that in this relay the distance between the first contact point 15 and the third contact point 21 is equal to the distance between the condenser plates. Given that the movement of the conductive element 7 is a rotational movement around the second contact point 17, the opposite end of the conductive element describes an arc such that it contacts with first or third contact point 15, 21 before the flat part 33 can touch the condenser plates.

Figure 12:
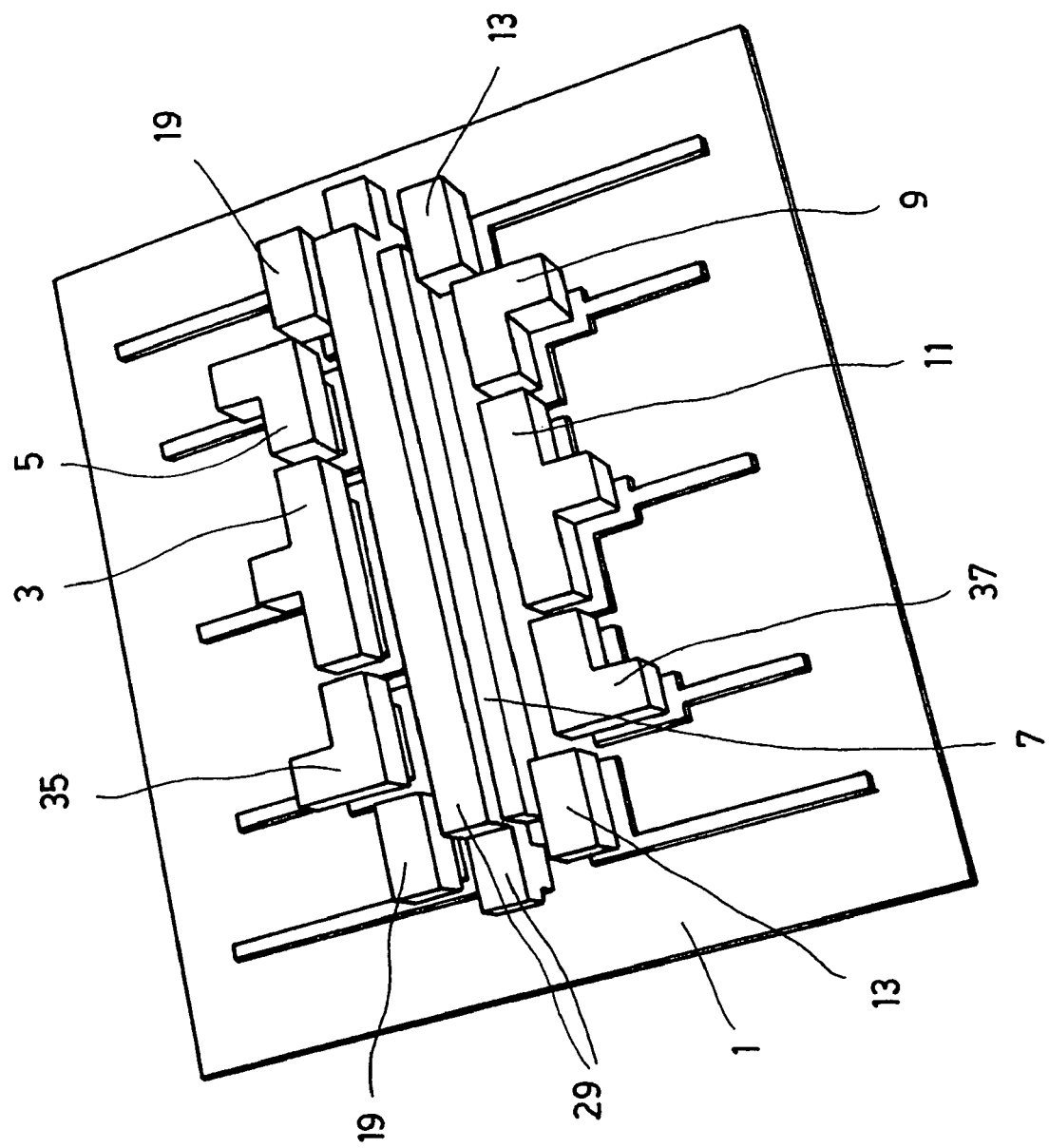
FIG. 12, a perspective view of a fifth embodiment of a relay according to the invention.

FIG. 12 shows another relay designed to be manufactured with polyMUMPS technology. This relay is similar to the relay of FIGS. 4 and 5, although it has, additionally, a fifth condenser plate 35 and a sixth condenser plate 37.

Figure 13:
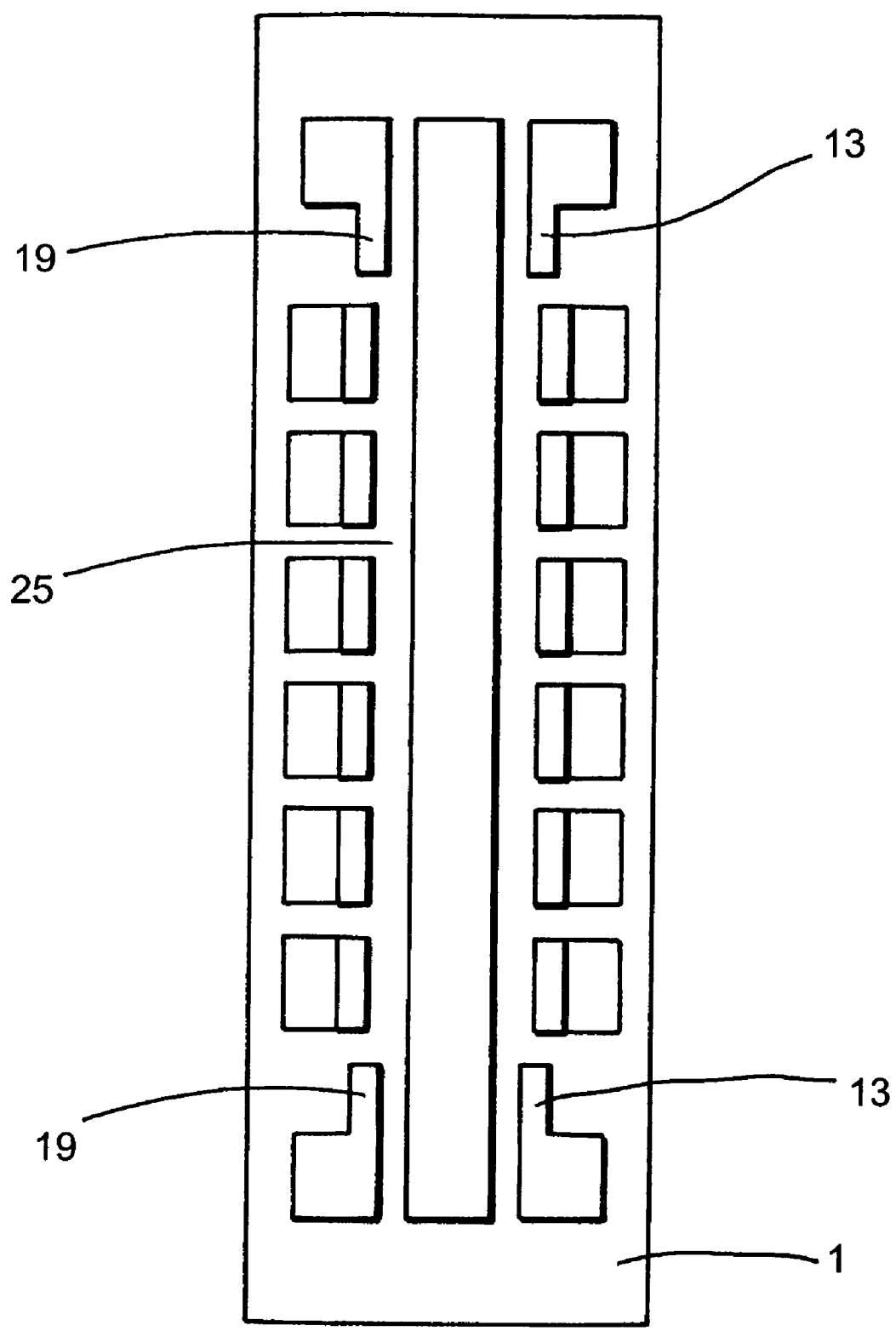
FIG. 13, a plan view of a sixth embodiment of a relay according to the invention.

FIG. 13 illustrates a relay equivalent to that shown in FIGS. 4 and 5, but which has six condenser plates in the first zone and six condenser plates in the second zone. Additionally, one should note the upper cover which avoids exit of the conductive element 7.

Figure 14:
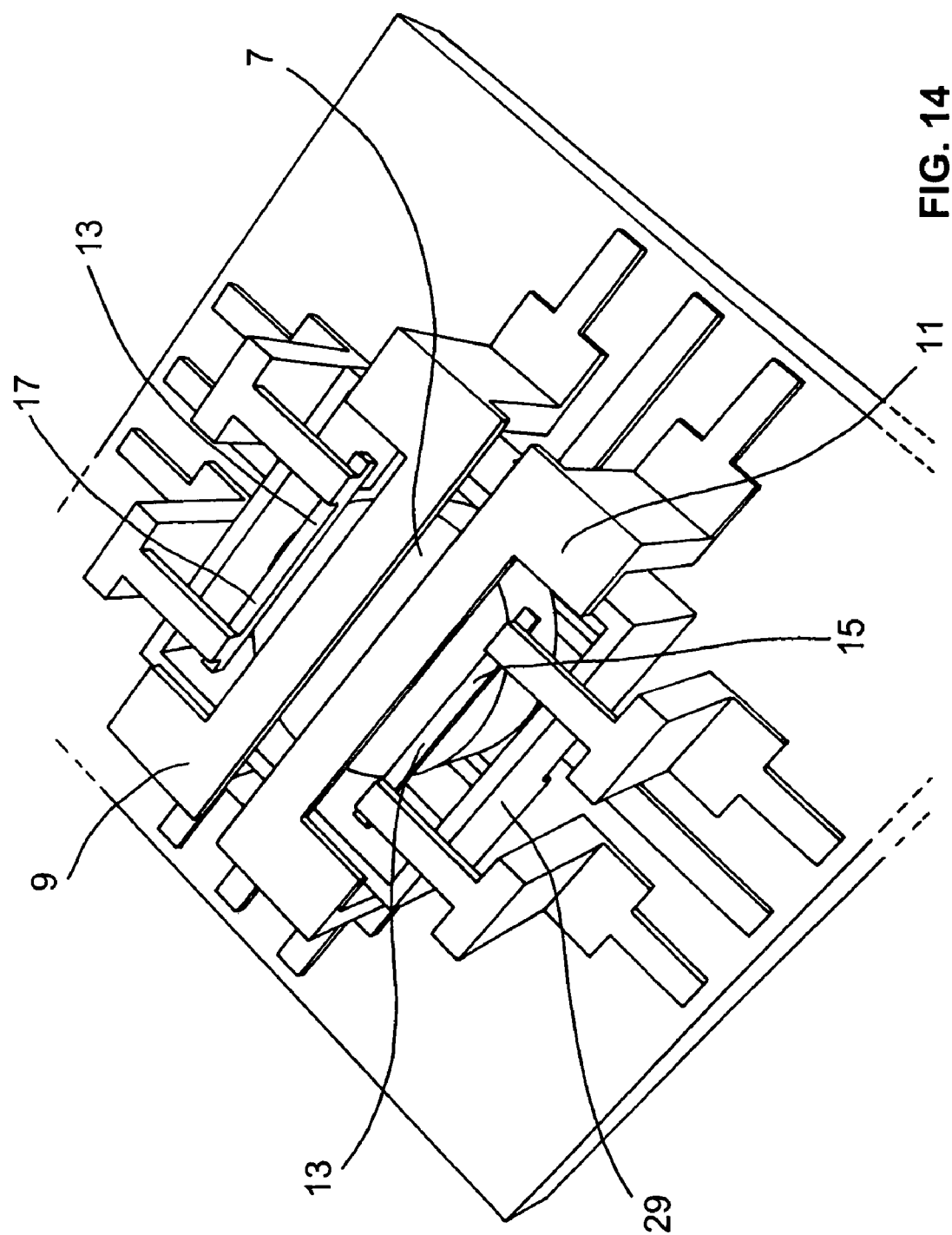
FIG. 14, a perspective view of a seventh embodiment of a relay according to the invention.
Figure 15:
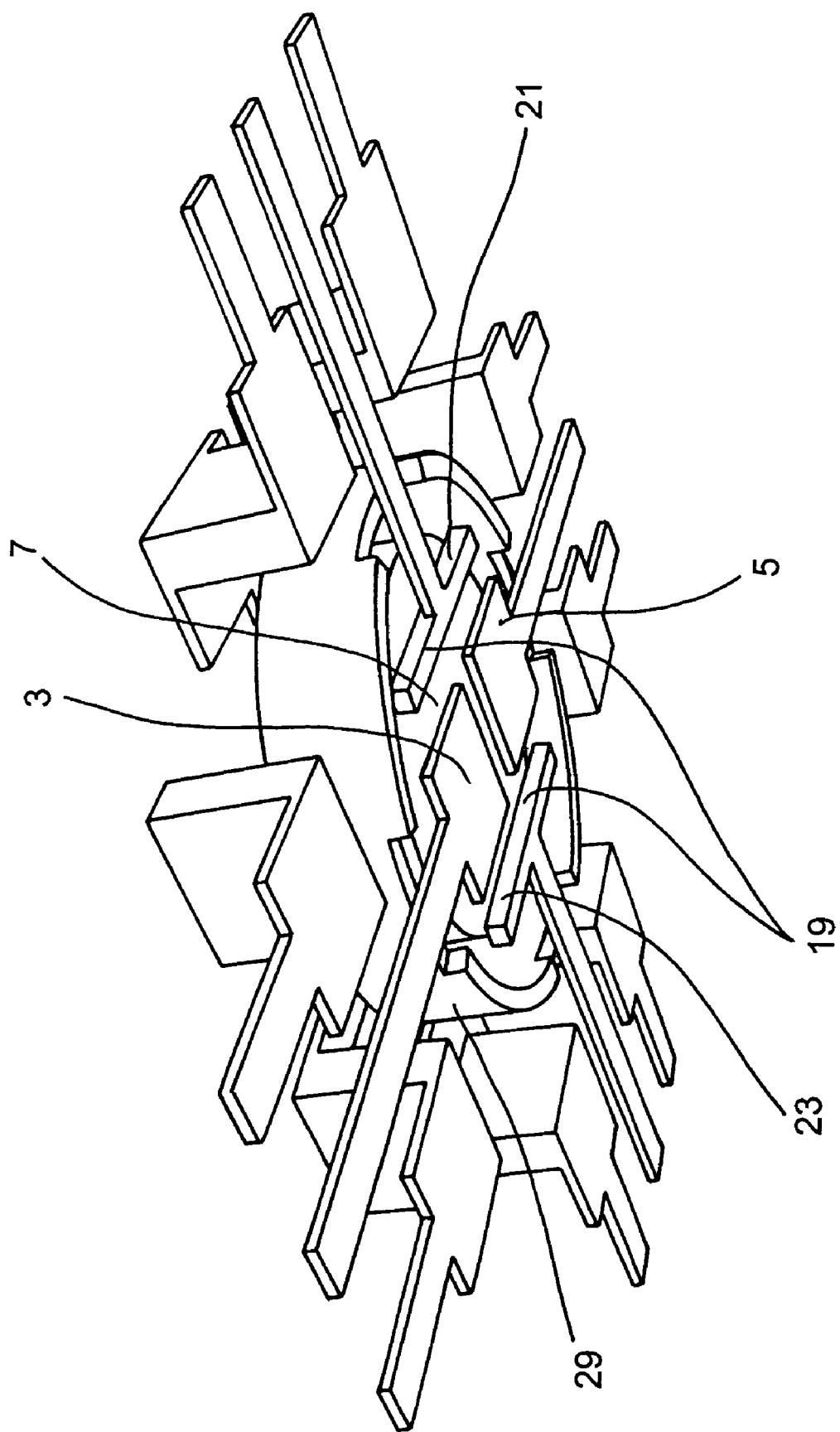
FIG. 15, a perspective view from below, without substrate, of an eighth embodiment of a relay according to the invention.
Figure 16:
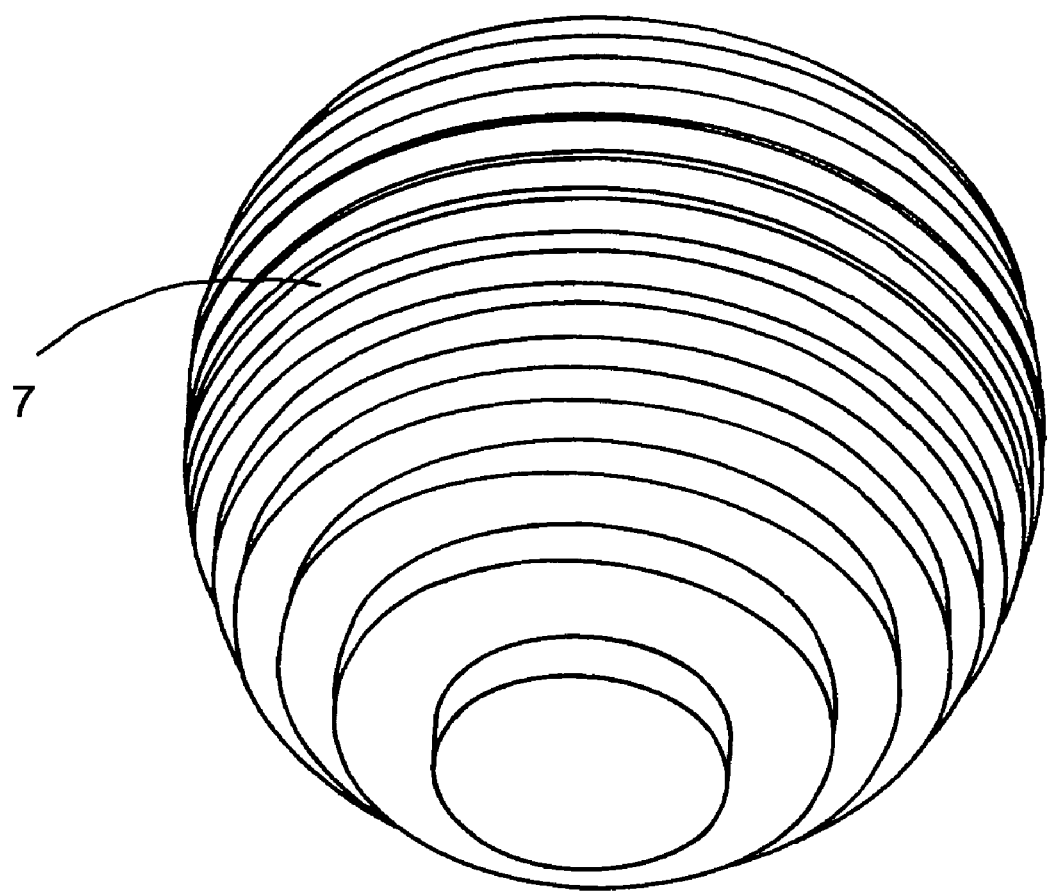
FIG. 16, a sphere produced with surface micromachining.

FIGS. 14 and 15 illustrate a relay in which the conductive element 7 is cylindrical. Referring to the relay of FIG. 14, the lateral walls 29 which surround the conductive element are parallelepipedic, whilst in the relay of FIG. 15 the lateral walls 29 which surround the conductive element 7 are cylindrical. With respect to FIG. 16, it shows a sphere manufactured by means of surface micromachining, it being noted that it is formed by a plurality of cylindrical discs of varying diameters. A relay with a spherical conductive element 7 such as that of FIG. 16 can be, for example, very similar conceptually to that of FIG. 14 or 15 replacing the cylindrical conductive element 7 by a spherical one. Should be taken into account however certain geometric adjustments in the arrangement of the condenser plates and the contact points in the upper end, to avoid the spherical conductive element 7 first touching the condenser plates and not the contact points or, as the case may be, the corresponding stops.

Figure 17:
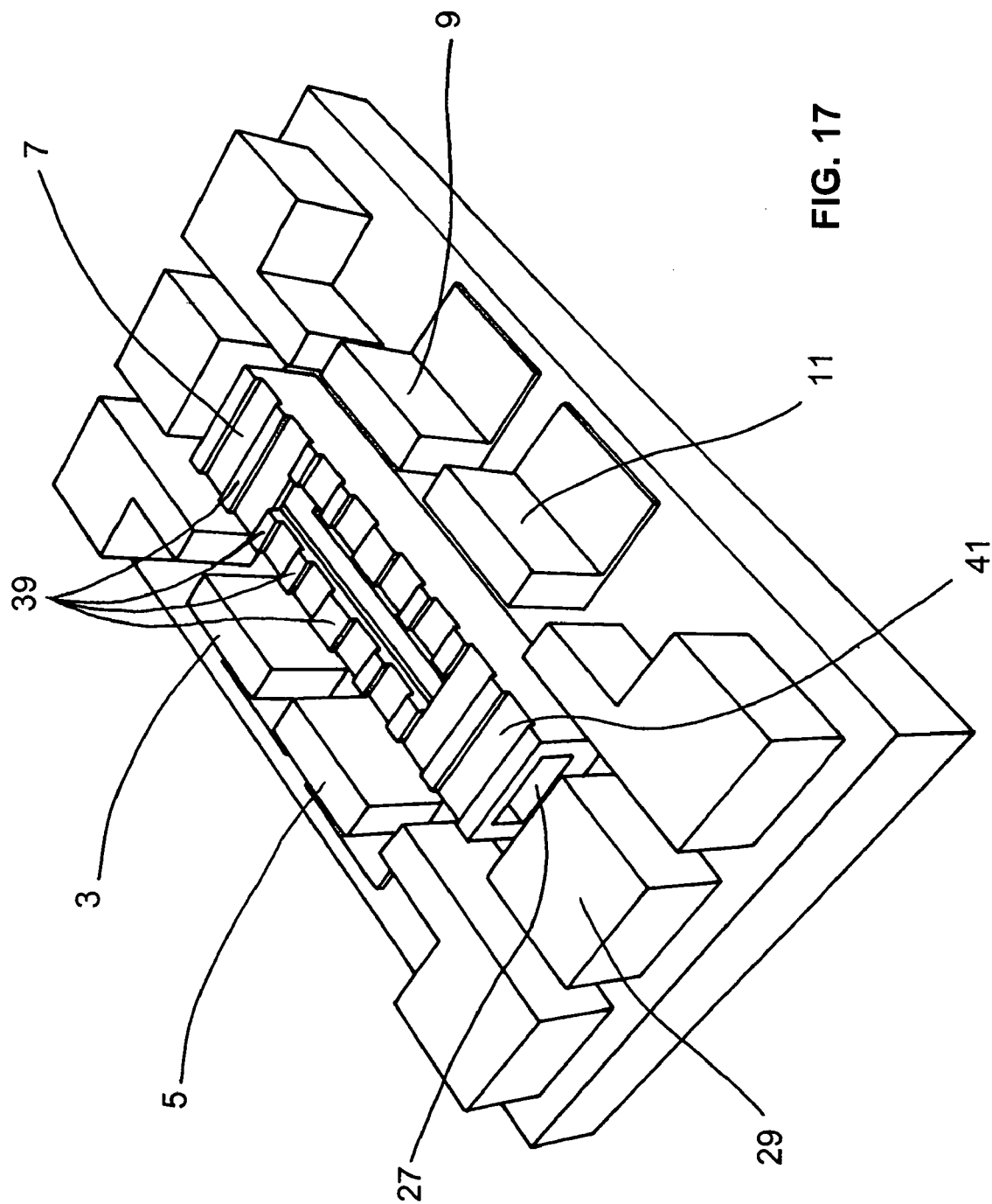
FIG. 17, a perspective view of a ninth embodiment of a relay according to the invention.

FIG. 17 shows a variant of the relay illustrated in FIGS. 4 and 5.

In this case the conductive element 7 has protuberances 39 in its lateral faces 41.

Figure 18:
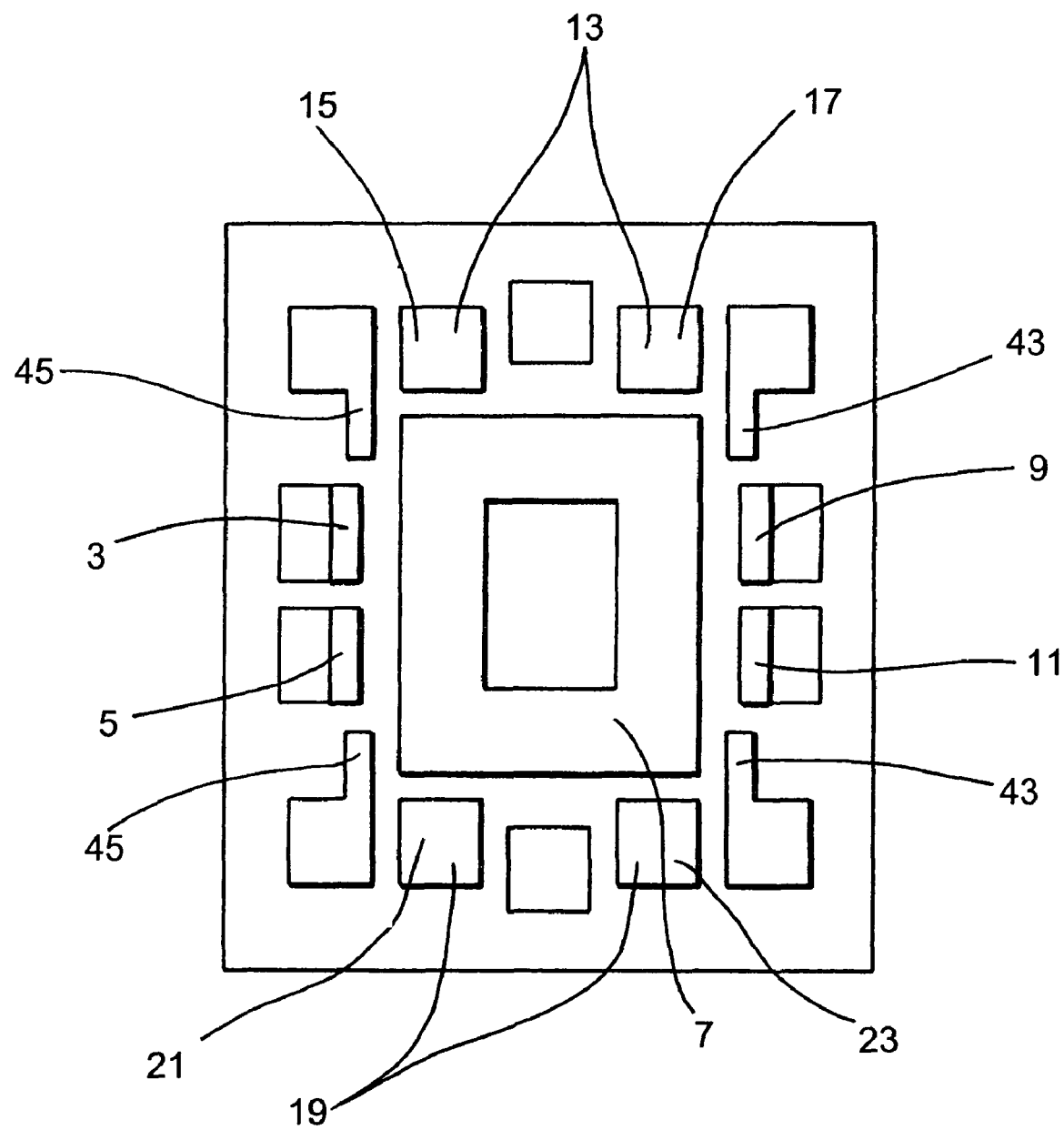
FIG. 18, a plan view, uncovered, of a tenth embodiment of a relay according to the invention.

FIG. 18 illustrates a variant of the relay according to the invention, specifically designed for use as a detector of Coriolis forces (gyrostat). In this case one can note that the relay has a first condenser plate 3 and a fourth condenser plate 5 arranged on the left (in accordance with FIG. 18) of a conductive element 7, and a second condenser plate 9 and a third condenser plate 11 arranged on the right of the conductive element 7. The relay also has two first stops 13, which are the first contact point 15 and the second contact point 17, in the upper part of FIG. 18, and two second stops 19 which are the third contact point 21 and the fourth contact point 23, in the lower part of FIG. 18. The conductive element 7 moves in a zigzag fashion between the condenser plates thanks to voltages applied between such. If the relay is subjected to Coriolis forces the conductive element 7 will be moved laterally, i.e. upwards or downwards according to FIG. 18 (supposing that the rotational movement is perpendicular to the plane of drawing). In making contact with the first contact point 15 and the second contact point 17 (or the third contact point 21 and the fourth contact point 23, and depending on the speed with which the zigzag is performed (and on the geometric parameters and the masses of the relay) the Coriolis force can be determined and, in consequence, the speed of rotation. The relay also has third stops 43 and fourth stops 45 which can (additionally and optionally) also be electric contacts. Thus the end travel of each zigzag movement is detected by the closing of the corresponding electric circuit, which is used by the relay control circuit. Alternatively, the position of the conductive element 7 can be determined by other procedures known by a person skilled in the art.

The invention claimed is:

1. A miniaturized relay comprising:
a first condenser plate;
a second condenser plate facing said first condenser plate, in which said second plate is smaller than or equal to said first plate;
an intermediate space;
a conductive element arranged in said intermediate space, said conductive element being a detached part for movement freely along the intermediate space between a first end of said intermediate space, defining a first zone, and a second end of said intermediate space, defining a second zone, said movement depending on voltages present in said first and second condenser plates, where said first condenser plate is arranged in said first zone and said second condenser plate is arranged in said second zone;
a third condenser plate arranged in said second zone, in which said third condenser plate is smaller than or equal to said first condenser plate, and in which said second and third condenser plates are, together, larger than said first condenser plate; and
a first contact point of an electric circuit, a second contact point of said electric circuit, in which said first and second contact points define first stops,
wherein at least one of said first, second and third condenser plates induces a charge distribution in said conducting element that forces said conducting element to move along the intermediate space,
wherein, when said element contacts said first stops said conductive element closes said electric circuit, and
wherein a closing of the electric circuit is not affected by a voltage of the conductive element.

2. The relay according to claim 1, further comprising a substrate that defines, with the first, second and third condenser plates and the first stops, the intermediate space, and conductive element's movement is in a direction perpendicular to the substrate.

3. The relay according to claim 2, wherein said first contact point is in said second zone.

4. The relay according to claim 3, wherein said second contact point is in said second zone.

5. The relay according to claim 2, further comprising:
a second stop in said first zone.

6. The relay according to claim 1, the closing of the electric circuit occurring even though the conductive element remains at a voltage in principle unknown since said conductive element being not in electrical contact with its surroundings when moving across said intermediate space.

7. The relay according to claim 6, the conductive element being not in electrical contact with walls that define said intermediate space when moving across said intermediate space.

8. A miniaturized relay comprising:
a first condenser plate;
a second condenser plate facing said first condenser plate, in which said second plate is smaller than or equal to said first plate;
an intermediate space;
a conductive element arranged in said intermediate space, said conductive element being a detached part for movement freely along the intermediate space between a first end of said intermediate space, defining a first zone, and a second end of said intermediate space, defining a second zone, said movement depending on voltages present in said first and second condenser plates, where said first condenser plate is arranged in said first zone and said second condenser plate is arranged in said second zone;

a third condenser plate arranged in said second zone, in which said third condenser plate is smaller than or equal to said first condenser plate, and in which said second and third condenser plates are, together, larger than said first condenser plate;

a first contact point of an electric circuit, a second contact point of said electric circuit, in which said first and second contact points define first stops, and upon said element contacting said first stops said conductive element closes said electric circuit;

a substrate that defines, with the first, second and third condenser plates and the first stops, the intermediate space, and conductive element's movement is in a direction perpendicular to the substrate; and a third contact point arranged in said first zone, in which said third contact point defines a second stop, such that said conductive element closes a second electric circuit when in contact with said second contact point and said third contact point, wherein said conductive element comprises a conductive element part which defines an axis, in the interior of which is housed said second contact point, and a flat part which protrudes from one side of said conductive element part and which extends in the direction of said axis, in which said flat part has a height, measured in the direction of said axis, which is less than a height of said cylindrical part measured in the direction of said axis.

9. The relay according to claim 8, wherein said conductive element part being s a hollow cylindrical part.

10. The relay according to claim 8, wherein said conductive element part being a hollow parallelepipedic part.

* * * * *